(12) United States Patent
Wynne et al.

(10) Patent No.: US 12,536,884 B1
(45) Date of Patent: Jan. 27, 2026

(54) RETAIL CHECKOUT WITH MULTI-SIGNAL BULK ITEM IDENTIFICATION

(71) Applicant: NCR Voyix Corporation, Atlanta, GA (US)

(72) Inventors: Thomas Burton Wynne, Bentonville, AR (US); Rafael Yepez, Duluth, GA (US); Thomas Joseph Puorro, Dallas, TX (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/830,436

(22) Filed: Sep. 10, 2024

(51) Int. Cl.
| | |
|---|---|
| G07G 1/00 | (2006.01) |
| G06K 7/10 | (2006.01) |
| G06V 10/70 | (2022.01) |
| G07G 1/01 | (2006.01) |

(52) U.S. Cl.
CPC ......... *G07G 1/009* (2013.01); *G06K 7/10445* (2013.01); *G06V 10/70* (2022.01); *G07G 1/01* (2013.01)

(58) Field of Classification Search
CPC ........... G06K 7/10861; G06K 7/10435; G06K 7/10445; G06K 19/08; G07G 1/00; G07G 1/0036; G07G 1/0045; G07G 1/009; G06Q 20/20; G06Q 20/208; G06V 20/68
USPC .......................................... 235/383; 348/150
See application file for complete search history.

(56) References Cited

U.S. PATENT DOCUMENTS

| | | | | |
|---|---|---|---|---|
| 2006/0261157 | A1* | 11/2006 | Ostrowski | G07G 1/0054 235/383 |
| 2009/0027205 | A1* | 1/2009 | Suzuki | G07G 1/0036 340/572.1 |
| 2010/0217678 | A1* | 8/2010 | Goncalves | G07G 1/0063 382/209 |
| 2012/0037699 | A1* | 2/2012 | Sugita | G06Q 30/06 235/383 |
| 2018/0341842 | A1* | 11/2018 | Egan | G07G 1/0045 |
| 2020/0265689 | A1* | 8/2020 | Iizaka | G07G 1/0063 |
| 2022/0270269 | A1* | 8/2022 | Pattison | G06T 7/248 |

* cited by examiner

*Primary Examiner* — Suezu Ellis
(74) *Attorney, Agent, or Firm* — Schwegman Lundberg & Woessner, P.A.

(57) ABSTRACT

A hybrid checkout system that enables in-motion, multi-signal, bulk item identification is disclosed. The hybrid checkout system includes a computer vision apparatus that includes a plurality of cameras fixed at different locations relative to a conveyor belt. The conveyor belt includes markings that assist a user with item placement. RFID sensors are provided with the hybrid checkout apparatus. The cameras capture multiple images of items placed on the belt as the items are in motion. Each camera captures multiple images of the items captured from different vantage points as the items are in motion. In addition, the RFID sensors gather RFID data from RFID tags affixed to the items, as the items are in motion. The image data and other sensor data is provided as a multi-signal input to a machine learning model that is trained to recognize items and output item identifiers for the items. Pricing information corresponding to the item identifiers received from the model is determined and the items and their respective prices are added to a transaction record.

16 Claims, 5 Drawing Sheets

RETAIL CHECKOUT WITH MULTI-SIGNAL BULK ITEM IDENTIFICATION

BACKGROUND

Consumer self-checkout adoption has accelerated in recent years due to a variety of factors. Among these are the COVID-19 pandemic and the associated risk of disease transmission during cashier-assisted transactions. In addition, labor shortages—which were exacerbated by the pandemic and have persisted since—have forced retailers to reduce the number of staffed lanes that are available, thereby requiring consumers who would have otherwise used a staffed lane to instead complete their transactions at a self-checkout terminal. Aside from the pandemic-related reasons noted above, many consumers prefer self-checkout because they view it as a more efficient way to complete their transaction, particularly if they have a limited number of items to purchase or the lines for cashier-assisted lanes are long.

At the same, some consumers continue to be reluctant to adopt self-checkout. Conventional self-checkout, like conventional cashier-assisted checkout, involves a linear item identification process that requires the operator to add each item in a basket of items to be purchased individually to a transaction record. In such a linear item identification process, each item is identified serially based, for example, on a barcode scan of the item, a product lookup (PLU) code keyed in or determined based on an operator's selection from a set of candidate choices, or the like. If a consumer has a large number of items to purchase, this linear item identification process can become cumbersome, requiring the consumer to individually provide input (e.g., a barcode scan) for each item.

DETAILED DESCRIPTION

Figure 1:
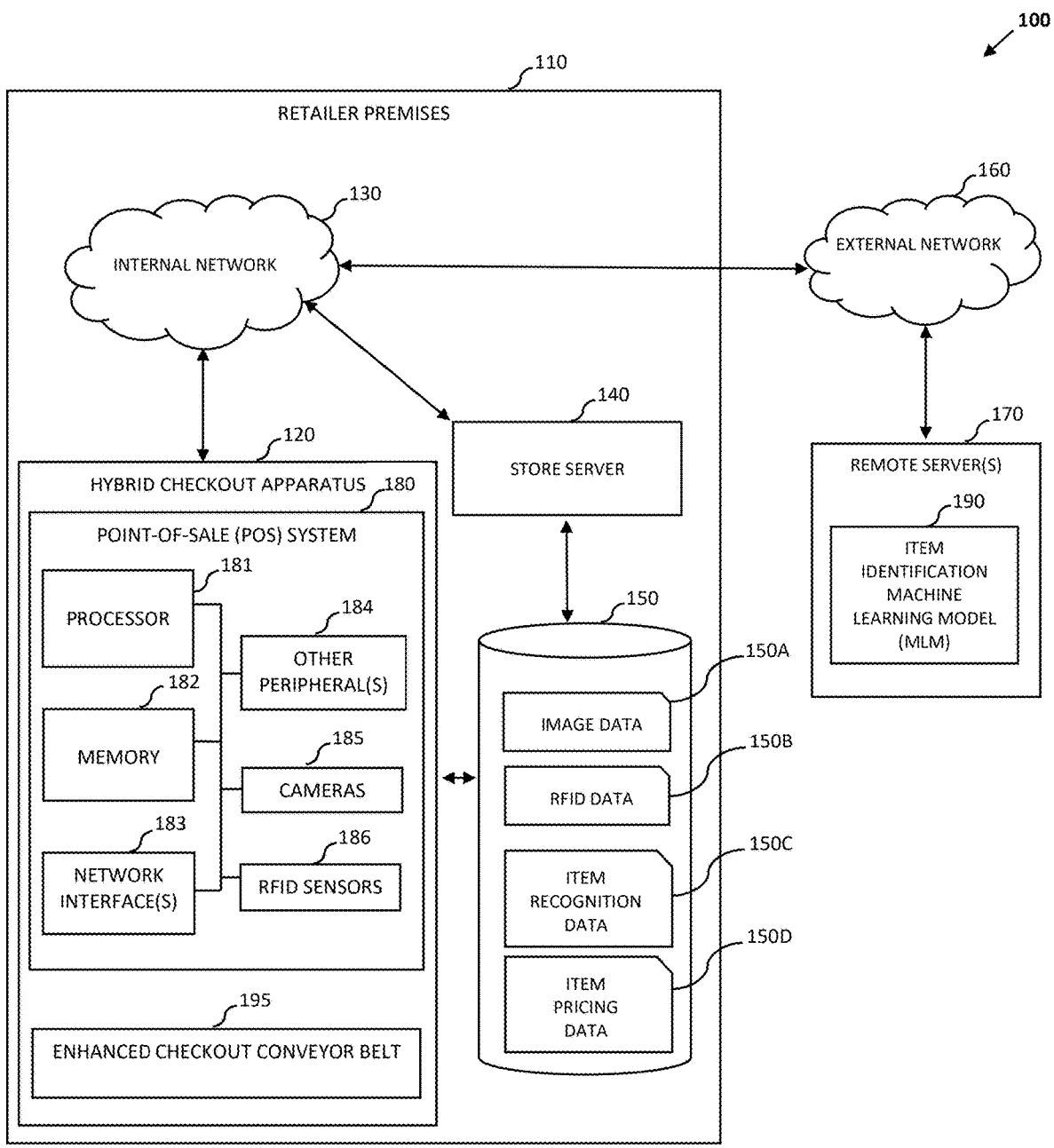
FIG. 1 is a block diagram of a computer vision-based, multi-signal hybrid checkout system architecture, according to an example embodiment.

Consumers utilize self-checkout for a variety of reasons, including to experience a more efficient checkout process, to avoid contact with cashiers to, for example, mitigate the risk of disease transmission, to avoid long lines at staffed lanes (particularly when the consumer has a small basket of items), and so forth.

At the same, however, some consumers continue to be reluctant to adopt self-checkout. Some consumers may not be comfortable with the self-checkout process, in particular, scanning items and/or keying in product lookup (PLU) codes themselves. In addition, conventional self-checkout, like conventional cashier-assisted checkout, involves a linear item identification process that requires the operator to add each item in a basket of items to be purchased individually to a transaction record. In such a linear item identification process, each item is identified serially based, for example, on a barcode scan of the item, a PLU code keyed in or determined based on an operator's selection from a set of candidate choices, or the like. If a consumer has a large number of items to purchase, this linear item identification process can become cumbersome for the consumer, requiring them to individually provide input (e.g., a barcode scan) for each item. While conventional cashier-assisted checkouts are also linear in nature, a consumer who typically uses self-checkout and who does not have other reasons for avoiding interaction with a cashier (e.g., avoiding disease transmission), may instead actually choose to use a cashier-assisted checkout to avoid having to scan and/or key in PLUs for a large number of items themselves.

Computer vision-based self-checkout technologies have been developed that allow multiple items to be placed simultaneously on a scan area and that use computer vision to identify and add the items to a transaction record. These computer vision-based self-checkout technologies make the checkout process less linear by obviating the need to scan items individually, but they can still become burdensome to a consumer since the scan area has limited real estate and if the consumer has a large basket of items, they would need to (potentially repeatedly) remove items from the scan area and place a new set of items thereon. In some cases, the computer vision-based self-checkout may not even be capable of handling batch item recognition in connection with a single transaction. Further, while some checkout technologies—computer vision-based or otherwise—may enable identifying items without having to remove them from a basket or cart, these technologies are expensive and suffer from various technical problems that impact the accuracy of the item recognition, such as difficulty identifying items due to occlusion.

Embodiments of the technology disclosed herein address the aforementioned technical problems associated with both self-checkout and cashier-assisted checkout by a providing a hybrid checkout system that combines computer vision with other sensor signals to generate a multi-signal input that is analyzed to identify and recognize items while they are in motion, thereby transforming a linear item identification process into a bulk process at higher accuracy levels. The hybrid checkout system provides a checkout experience that appeals to both self-checkout and cashier-assisted checkout consumers alike. In some embodiments, the hybrid checkout system may be staffed by a cashier who can assist with the checkout process, including bagging items that have been identified and added to the transaction record as the come off the conveyor belt, assisting with placement of an item on the conveyor belt again if the item is not recognized based on the multi-signal input, and optionally, to provide an indication when there are no more items to add to the transaction. In other embodiments, the hybrid checkout system may be operated by a consumer as a self-checkout without the need for a cashier.

In example embodiments, the hybrid checkout system includes a conveyor belt on which items can be placed; a computer vision apparatus that includes a plurality of overhead cameras located at different positions on the computer vision apparatus and having at least partially non-overlapping fields-of-view (FOVs); and one or more other types of sensors such one or more radio frequency identification (RFID) sensors. The conveyor belt may be an enhanced checkout conveyor belt that includes indicia thereon that indicate/direct placement of items on the belt. For example, the enhanced conveyor belt may be marked with a grid pattern that indicates to the operator of the hybrid checkout system (e.g., a consumer, cashier, or attendant) that a single item is to be placed in each cell of the grid. Other forms of indicia can be used in addition to, or as an alternative to, the grid pattern. For example, markings may be applied to the belt surface (e.g., an 'X') to indicate a specific location at which an item should be placed.

In some embodiments, the conveyor belt may automatically start moving upon detecting one or more items placed thereon. In other embodiments, an operator may need to provide some form of input (e.g., touch input on a display, a physical button-press, etc.) to initiate movement of the belt. During movement of the items on the belt, multiple cameras (e.g., overhead cameras) may capture images of the items while in motion. By virtue of their varied placement, the cameras may have different FOVs and may capture images of the items from multiple different angles. Because the images are captured while the items are in motion, each camera images of the items from different vantage points/angles as the items move through the camera's FOV. Each camera may capture the images at a configurable frame rate. In this manner, each camera captures multiple images of each item from different vantage points.

In addition to the image data generated by the cameras, the hybrid checkout system may also include one or more other types of sensors that capture additional sensor data, which can be used in conjunction with the image data to perform bulk item identification. For example, one or more RFID sensors/readers may be embedded between a top and a bottom surface of the conveyor belt. Each RFID reader may include a scanning antenna and a transceiver. An embedded RFID reader may interrogate an RFID tag affixed to an item. This may involve transmitting a radio wave signal to the tag that activates the tag and causes the tag to return a signal to the reader that the RFID reader is capable of translating to determine an identifier for the tag. The item can then be identified based on a stored association between the tag identifier and an item identifier.

In example embodiments, a multi-signal input is provided as input to an item identification machine learning model (MLM). In example embodiments, the multi-signal input includes the images captured of the items from multiple camera angles by multiple different cameras, RFID data indicative of signals detected by embedded RFID sensors, and optionally, other types of sensor data such as infrared (IR) data captured by IR sensors of the hybrid checkout system. The item identification MLM may have been previously trained to a desired level of accuracy based on at least labeled image data. The item identification MLM may receive the multi-signal data as input and output item identification/recognition data that includes a set of item identifiers for the detected items along with, optionally, confidence values indicative of the likelihood that the item identifiers accurately identify the items on the belt. The item identifiers can then be used to look up pricing information for the items and add the items and their corresponding prices to a transaction record for the current transaction.

Embodiments of the hybrid checkout technology disclosed herein provide technical solutions to the aforementioned technical problems associated with the self-checkout and cashier-assisted checkout. For example, the hybrid checkout system disclosed herein enables bulk item identification that substantially improves transaction velocity over the typical linear item identification process associated with conventional self-checkout and conventional cashier-assisted checkout. Moreover, the bulk item identification is performed as the items are in motion by utilizing multiple fixed position cameras that have at least partially non-overlapping FOVs to capture images of items from multiple different angles/vantage points as the items travel on a moving belt surface. The multiple views captured of each item enable an item identification MLM to recognize the items with greater confidence/accuracy than is possible with computer vision self-checkout, for example, where each camera captures images of items from a single view. In addition, according to embodiments of the disclosed technology, this multiple vantage point image data is supplemented by additional sensor data (e.g., RFID data) to further improve the confidence/accuracy of the item recognition.

In this manner, the in-motion, multi-signal, bulk item identification process enabled by the hybrid checkout system according to embodiments of the disclosed technology eliminates the burden on an operator associated with a linear checkout process, while at the same time, substantially increasing transaction velocity and providing more accurate item recognition capabilities. Th greater accuracy is due, at least in part, to the image data including images of each item from multiple vantage points and the input data to the item identification/recognition model being multi-signal data from multiple types of sensors.

FIG. 1 is a block diagram of a computer vision-based, multi-signal hybrid checkout system architecture, according to example embodiments of the disclosed technology. It is to be noted that the components are shown schematically in greatly simplified form, with only those components relevant to understanding of the embodiments being illustrated. Furthermore, the various components illustrated in FIG. 1 and their arrangement is presented for purposes of illustration only. It is to be noted that other arrangements with more or less components are possible without departing from the teachings presented herein and below.

A portion of the architecture 100 is provided in a retail environment 110, which may include a brick-and-mortar store such as a supermarket, a discount store, a wholesale retailer, a department/specialty store, a gas station, or the like. A hybrid checkout apparatus 120 is provided within the store 110. While a single hybrid checkout apparatus 120 is depicted in FIG. 1, it should be appreciated that multiple hybrid checkout apparatuses 120 may be provided.

The hybrid checkout apparatus 120 includes a point-of-sale (POS) system 180. The POS system 180 includes one or more processors 181 and a memory 182. The POS system 180 further includes one or more network interfaces 183 that enable communication with, for example, one or more store servers 140 via an internal network 130. The POS system 180 further includes cameras 185, RFID sensors 186, and one or more other peripherals 184. The other peripheral(s) 184 may include a payment card reader that may be capable of accepting contactless payments such as via near field communication (NFC), and which may optionally include a pinpad. The POS system 180 is configured to receive financial transaction information from a payment mechanism such as a mobile device or from a financial card, such as a credit, debit, or gift card, via the payment card reader. The POS system 180 may thus obtain a consumer's financial account-related information via one or more of a number of input mechanisms.

The other peripheral(s) 184 may further include a barcode reader/scanner, a weigh scale, a receipt printer, a display, and the like. The POS system 180 may be configured to receive item identifying information from the barcode scanner as a result of an operator using the scanner to scan barcodes affixed to items. The POS system 180 may be configured to receive weight data from the weigh scale for items that are priced based on weight.

In example embodiments, the cameras 185 may include multiple overhead cameras that are attached to, affixed to, or otherwise integrated with one or more support structures. The overhead cameras may have at least partially non-overlapping FOVs. The RFID sensors 186 may be configured to interrogate and receive responses back from RFID tags, which may be affixed to items. The hybrid checkout apparatus 120 further includes an enhanced checkout conveyor belt 195. The belt 195 will be described in more detail in reference to FIG. 2.

The cameras 185 may capture images of items placed on the belt 195 while the items are in motion on the moving belt surface. As a result of being located at different overhead positions, the cameras 185 have different FOVs, and thus, capture images from different angles. Moreover, because the cameras 185 are configured to capture images as the belt 195 is in motion, any given camera is able to capture images of items in its FOV from multiple different vantage points/angles. The captured images may be stored as image data 150A in one or more datastores 150. While embodiments of the disclosed technology may be described mostly in reference to overhead cameras, it should be appreciated that one or more cameras may be located such that their FOV encompasses substantially a side view of an item, an upward perspective view of an item, or the like.

In addition to the captured item images, RFID sensors 186 may interrogate and capture RFID data from RFID tags/labels affixed to items. The RFID data may include stored associations between tag identifiers and item identifiers for the items and may be stored in the datastore 150 as RFID data 150B. Similar to the image data 150A, the RFID sensors 186 may capture the RFID data 150B from the RFID tags affixed to the items while the items are in motion on the belt 195. It should be appreciated that the POS system 180 may include additional types of sensors such as IR sensors, weight sensors, or the like to capture additional sensor data relating to the items while the items are in motion.

The POS system 180 may communicate with the store server 140, and optionally, other POS systems in the store 110, via the internal network 130. The POS system 180 may also communicate with other internal and external entities directly, via the internal network 130, or through an external network 140. The POS system 180 may communicate, for example, via one or more micro, pico or nano base stations (BSs). Multiple POS systems 180 may communicate with each other and external devices using any of a number of different techniques, such as WiFi, Bluetooth, or Zigbee, to name a few. In some cases, the POS system 180 may match the item information and pricing information with another entity, e.g., with the internal store server 140 via the internal network 130 and/or with one or more remote servers 170 via the external network 160. The POS system 180 may, in addition, capture financial information related to a transaction and attempt to confirm the information by transmitting the captured financial information to one or more servers via at least one of internal network 130 and one or more external networks 160.

In various embodiments, the networks 130, 160 may include one or more wired and/or wireless networks. The external network 140 may be, for example, the Internet or a private network. The internal network 130 may be, for example, a wired or wireless local area network (LAN). In some embodiments, the internal network 130 may not be provided, and the POS system 180 may communicate directly with one or more external networks 160. In other embodiments, POS system 180 may be able to communicate with an external network 160, but only indirectly through the store server 140. It should be appreciated that other equipment, such as base stations, routers, access points, gateways and the like used in communicating through the networks 130, 140 are not shown for convenience.

An item identification machine learning model (MLM) 190 is illustratively depicted as being hosted/executing on the remote server 170. The item identification MLM 190 may be implemented as executable instructions programmed and residing within a memory and/or a non-transitory computer-readable (processor-readable) storage medium and executed by one or more processors of one or more devices (e.g., processor(s) of the remote server 170). A same entity or different entities may operate the remote server 170, the store server 140, and/or the POS system 180. In some embodiments, the POS system 180 may send at least the image data 150A captured by the cameras 185 and the RFID data 150B captured by the RFID sensors 186 as multi-signal input data to remote server 170 via internal network 130 and external network 160. The multi-signal data may be provided as input data to the item identification MLM 190, which has been previously trained on at least labeled item image data. The item identification MLM 190 may receive the multi-signal data as input, and output item recognition data 150C, which may be received by the POS system 180 and/or the store server 140 and stored in the database 150. The item recognition data 150C may include item identifiers for the recognized items (e.g., SKUs for the items), and may further include confidence values associated with the SKU outputs.

In some embodiments, the image data 150A and/or the RFID data 150B may not be housed locally within the datastore 150, but rather may be stored on the remote server 170 or a remote datastore (not shown) accessible by the remote server 170. In other embodiments, the image data 150A and/or RFID data 150B may be stored both locally and remotely. In some embodiments, the item identification MLM 190 (and/or one or more other machine learning models) may additionally, or alternatively, reside and execute locally at the store 110 such as on store server 140 or on a storage medium of the POS system 180.

The POS system 180 may match the item recognition data 150C (e.g., a scanned bar code, an item identifier received from the item identification MLM 190, etc.) with corresponding pricing data 150D stored in the datastore 150, which optionally may be stored in the memory 182 and retrieved therefrom. Alternatively, the POS system 180 may communicate, e.g., via the internal network 130, with another entity (e.g., the store server 140) to obtain the pricing data, which may then be used to add the items and their corresponding prices to the transaction record. The pricing information may be displayed on a display of the POS system 180.

The POS system 180 may be configured to access the datastore 150 via a directed wired connection, via the internal network 130, and/or indirectly, via store server 140. Further, in some embodiments, the image data 150A may include annotated/labeled image data that associates known item identifiers (e.g., SKUs) with corresponding images of the items, and which may have been provided as training data to the model 190.

The datastore 150 may include any storage configured to retrieve and store data. Some examples of such storage include, without limitation, flash drives, hard drives, optical drives, cloud storage, and/or magnetic tape. Datastore 150 may include, but are not limited to, databases (e.g., relational, object-oriented, etc.), file systems, flat files, distributed datastores in which data is stored on more than one node of a computer network, peer-to-peer network datastores, or the like. The datastore 150 may store one or more database managements systems (DBMS). The DBMS may be loaded into the memory 182 and may support functionality for accessing, retrieving, storing, and/or manipulating data. The DBMS may use any of a variety of database models (e.g., relational model, object model, etc.) and may support any of a variety of query languages. The DBMS may access data represented in one or more data schemas and stored in any suitable data repository.

In some embodiments, the item recognition data 150C may represent a mapping between item identifiers (e.g., SKUs) and corresponding images in the image data 150A. The item recognition data 150C may include data that associates item identifiers such as SKUs for items detected by the item identification MLM 190 with the names, visual/graphical representations (e.g., thumbnail images), descriptions, or the like of the corresponding items. In some embodiments, the item recognition data 150C may also link item identifiers (e.g., SKUs) to corresponding images in the image data 150A for those items for which the MLM's 190 output failed to satisfy an acceptable confidence threshold. In some embodiments, these images may be provided back to the item identification MLM 190 with an indication as to whether the correct item identifiers (e.g., SKUs) were recognized for the items, such that the MLM 190 can learn based on the received feedback data and improve its item recognition accuracy.

In some embodiments, the item quantities detected using computer vision can be cross-referenced against the item quantities detected using RFID to determine whether they match. More specifically, a count of the number of items detected by the MLM 190 using computer vision can be generated and compared to a count of the number of RFID tags detected by the RFID sensors 186. If there is a mismatch, this may be indicative of a potential shrink event, which can be further investigated by a store employee. More specifically, if a mismatch is detected, an alert (e.g., a message displayed at the POS system 180, a message sent to a mobile device of a store employee, etc.) may be generated to initiate an attendant intervention.

In some embodiments, the MLM 190 may not be able to detect/recognize one or more items at a suitable confidence level on a first pass of the items on the belt 195, in which case, an operator may be informed as such (e.g., via a message on a display of the POS system 180, an audible indication, or the like), and the operator (e.g., a consumer or a retailer employee) may place the items on the belt 195 again such that images of the items are captured again by the cameras 185 as the items move across the FOVs of the cameras 185. In such example scenarios, the RFID sensors 186 may receive signals from RFID tags affixed to the items that were not recognized by computer vision, in which case, the item count from the RFID sensors may be greater than the item count from the computer vision-based item detection, despite these scenarios likely not being indicative of shrink. As such, in these example scenarios, the comparison of the item count from the RFID detection to the item count from the computer vision may not be performed until all items have been suitable detected/recognized by the computer vision or the unrecognized items have otherwise been identified through other means, e.g., a barcode scan.

Figure 2:
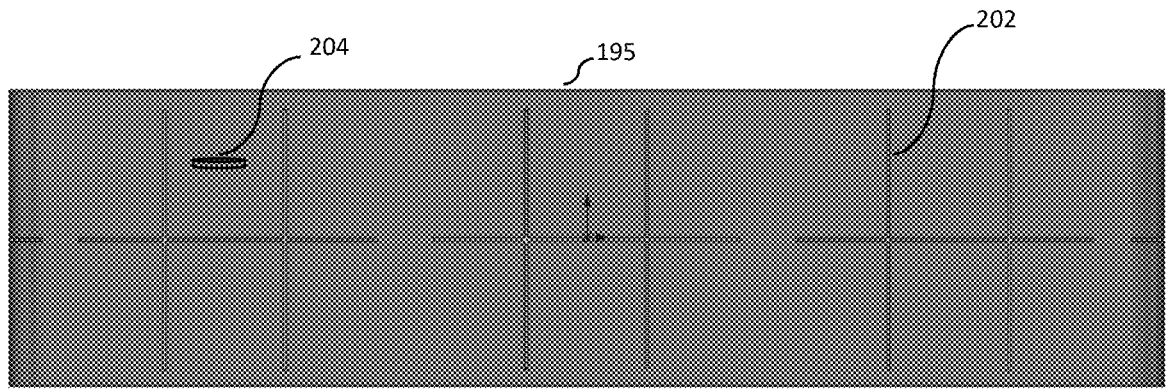
FIG. 2 depicts an enhanced checkout conveyor belt, according to an example embodiment.

FIG. 2 depicts the enhanced checkout conveyor belt 195 in more detail, according to an example embodiment. The belt 195 includes indicia 202 that guide an operator of the hybrid checkout apparatus 120 as to where to place items on the belt 195. The indicia 202 may take the form of a grid pattern such that a single item is meant to be placed in each cell of the grid. It should be appreciated that any suitable indicia (e.g., any suitable graphical representation/marking) can be applied to the belt 195 to assist an operator (e.g., a consumer) in item placement. For example, graphical markings may be applied to the belt 195 in addition to or as an alternative to the grid pattern. In some embodiments, a graphical marking may be provided at or close to a center location of each cell of the grid to further direct a user to place an item on the graphical marking. In other embodiments, the grid pattern may not be provided, but specific markings corresponding to specific locations where items should be placed on the belt 195 may be provided. In still other embodiments, a digital marking may be projected onto the belt surface to indicate where an item should be placed.

An example RFID sensor 204 is also shown in FIG. 2, i.e., one of RFID sensors 186. The RFID sensor 204 may be embedded in or otherwise integrated with the hybrid checkout apparatus 120, such as in an area between a top and a bottom surface of the belt 195. The belt 195 is formed of a material or otherwise designed to allow RFID frequency passthrough, while at the same time, being suitably durable and having protection against debris or liquid that falls on the belt 195. It should be appreciated that while a single exemplary RFID sensor 204 is shown, multiple RFID sensors 204 may be provided. In some embodiments, the RFID sensors 204 may be positioned to face upwards towards a top surface of the belt 195 and a ceiling of the store 110 to help minimize reading RFID tags associated with items not placed on the belt 195. In some embodiments, the RFID sensors 204 have a power reading that is strong enough to read tags that are several feet away, but low enough not to read at a distance that goes beyond the image capture hardware (e.g., the overhead cameras).

Figure 3:
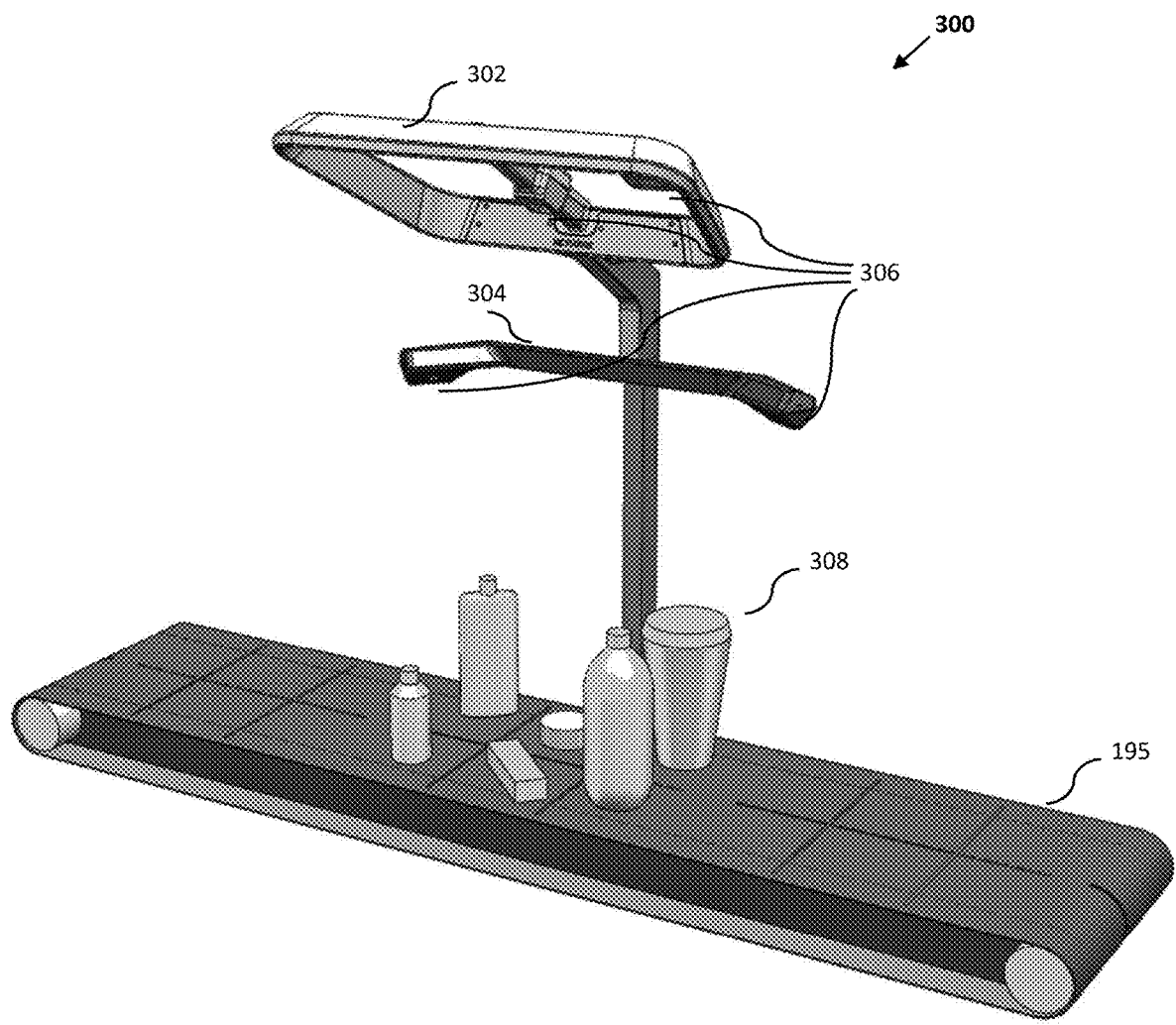
FIG. 3 depicts a computer vision apparatus and enhanced conveyor belt of a hybrid checkout system, according to an example embodiment.

FIG. 3 depicts a computer vision apparatus 300 of the hybrid checkout apparatus 120, according to an example embodiment. The computer vision apparatus 300 includes an open frame support structure 302, which in the embodiment depicted has a substantially trapezoidal cross section that is angled slightly upwards. Various overhead cameras 306 may be attached to the support structure 302 at various positions. For example, a camera 306 may be attached to a side portion of the support structure 302 and a camera 306 may be attached to a support bar that extends from opposing sides of the support structure 302. The computer vision apparatus 300 further includes a sidearm 304, which may have one or more cameras 306 attached thereto, such as at opposing ends of the sidearm 304. The various cameras 306 may capture images of each of the items 308 placed on the belt surface from different angles as the items 308 are in motion on the belt 195. At the same, RFID sensors positioned under the top belt surface may also capture RFID data from RFID tags affixed to the items while the items are motion. In some embodiments, the RFID sensors may be positioned elsewhere. For example, one or more RFID sensors may be affixed to the computer vision apparatus 300 (e.g., to the support structure 302 and/or to the sidearm 304).

Figure 4A:
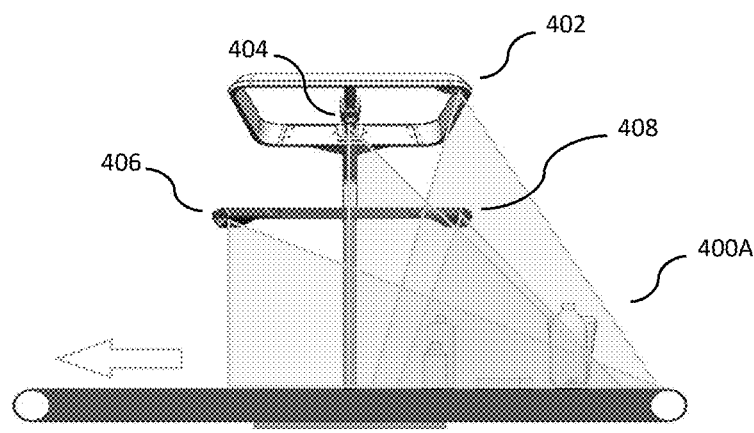
FIGS. 4A, 4B, and 4C depict the capture of data relating to a set of items by different sets of sensors based on the relative positions of the items to the sensors as the items are conveyed along a moving surface, according to an example embodiment.
Figure 4B:
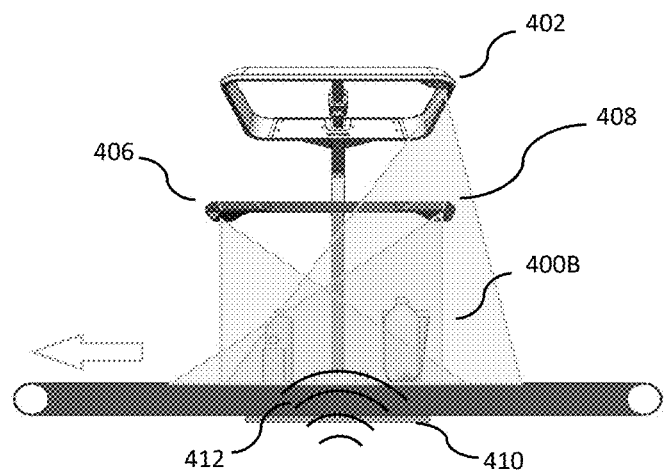
Figure 4C:
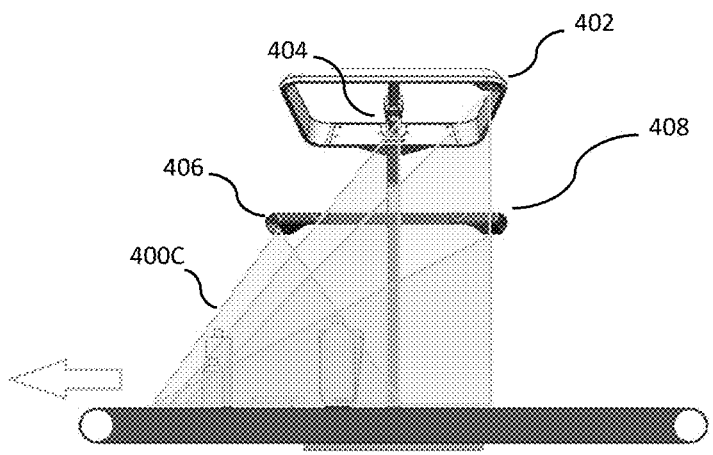

FIGS. 4A, 4B, and 4C depict the capture of data relating to a set of items by different sets of sensors based on the relative positions of the items to the sensors as the items are conveyed along a moving surface, according to an example embodiment. FIGS. 4A, 4B, and 4C depict various cameras

402, 404, 406, and 408 located at different positions on a computer vision apparatus, which may be the apparatus 300 of FIG. 3. In particular, cameras 402 and 404 are illustratively depicted as being attached to different portions of the support structure of the computer vision apparatus. Cameras 406 and 408 are depicted as being attached to a sidearm of the computer vision apparatus.

Referring first to FIG. 4A, a set of items is shown as being placed on the conveyor belt. The belt is assumed to be moving, and as such, the set of items are at a first instantaneous position 400A at the snapshot shown in FIG. 4A. At this point in time, the set of items may be within the respective FOVs of cameras 402, 404, 406, and 408. As such, each of these cameras may capture images of the set of items, with each captured image being from a different vantage point and capturing a different view of the item. As the items continue to move with the belt, they may continue to be in the FOV of one or more of the cameras, and as such, additional images of the items may be captured from different vantage points. In some embodiments, a camera may capture an image as long as a threshold number of items are at least partially within the camera's FOV (or some threshold amount of one or more items are within the camera's FOV). Alternatively, each camera may periodically capture images of its FOV regardless of whether any portion of the item is present in the FOV or not.

Now referring to FIG. 4B, in this snapshot the items are now in a second position 400B in relation to the computer vision apparatus. At this moment, cameras 402, 406, and 408 may capture images of the items from different angles/vantage points than from which those same cameras captured images of the items when they were in the first position 400A in relation to the computer vision checkout apparatus. At this point in time, an interrogation signal 412 transmitted by RFID sensor 410 may be received by one or more RFID tags of one or more of the items, which may transmit back RFID data that identifies the tags and the corresponding items to which they are affixed. In some embodiments, the camera 404 may not capture an image of the items as it may be directly overhead the items at this point in time, and such an image may not be suitable for item recognition.

Now referring to FIG. 4C, at this snapshot, the items are in a third position 400C relative to the computer vision apparatus. At this point in time, each of cameras 402, 404, 406, and 408 may again capture images of the items, but from angles/vantage points that are different from the images they captured of the items when they were in the first and second positions 400A, 400B relative to the computer vision apparatus.

It should be appreciated that FIGS. 4A-4C are merely illustrative. In some embodiments, all cameras may capture images of items throughout their movement on the belt. In addition, all RFID sensors may continuously send interrogation signals as items are conveyed on the belt. In some embodiments, the cameras and/or RFID sensors may capture data according to a predetermined activation schedule that is optimized to generate images that lead to more accurate item recognition results.

Figure 5:
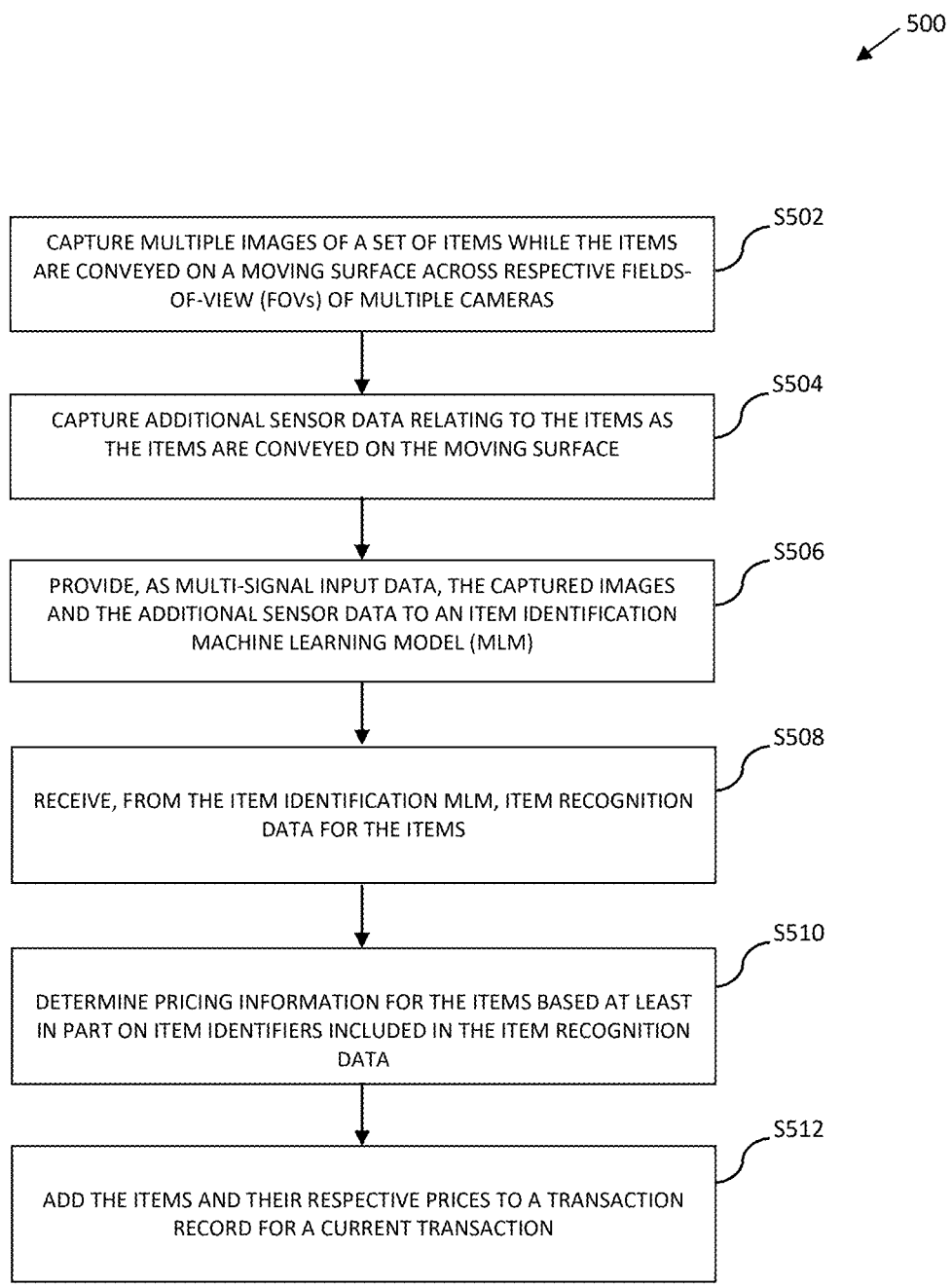
FIG. 5 is a flow diagram of an item identification process using the hybrid checkout system of FIG. 1, according to an example embodiment.

FIG. 5 is a flow diagram of an item identification/recognition method 500 using the hybrid checkout system of FIG. 1, according to an example embodiment. The method 500 may be performed, at least in part, by the processor 181 of the POS system 180 executing computer-executable instructions loaded into the memory 182.

At step S502, multiple images of a set of items may be captured by multiple cameras as the items are conveyed on a moving surface such as a moving conveyor belt. Each camera may capture images of the items from different vantage points/angles as the items move through the camera's FOV. The processor 181 may execute computer-executable instructions to trigger the cameras to capture the images. In some embodiments, the cameras may be triggered according to a predefined schedule that is designed to optimize the quality of the captured images.

At step S502, additional sensor data relating to the items is captured as the items are conveyed on the moving surface. The additional sensor data may include, for example, RFID data captured by one or more RFID sensors, which may be provided with the hybrid checkout apparatus 120, e.g., underneath the top surface of the conveyor belt. In some embodiments, the processor 181 may execute computer-executable instructions to trigger the RFID sensors to capture the RFID data. The additional sensor data may further include IR data, weight data, or the like, in some embodiments.

At step S504, the processor 181 may execute instructions to combine, integrate, or otherwise provide the image data and the additional sensor data to an item identification MLM as multi-signal input data. The item identification MLM has been previously trained on at least labeled image data, and optionally other sensor data, to recognize items and output identification data for the items.

At step S506, the processor 181 receives, as output from the item identification MLM, item recognition data that includes item identifiers for the recognized items (e.g., SKUs) along with confidence values associated with the predictions.

At step S508, the processor 181 determines pricing information for the recognized items based at least in part on the item recognition data. In particular, the processor 181 may perform a lookup of the corresponding prices for the recognized items based on the item identifiers received from the MLM.

At step S512, the processor 181 adds the items and their respective prices to a transaction record for a current transaction. In some embodiments, the text or graphical indications of the recognized items and their corresponding prices may be displayed on a display of the POS system 180.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter may lie in less than all features of a single disclosed embodiment. Thus, the following claims are hereby incorporated into the Description of the Embodiments, with each claim standing on its own as a separate exemplary embodiment, and any combination of the claimed subject matter being an embodiment as well.

The invention claimed is:

1. A method, comprising:
capturing, by one or more cameras, image data including a plurality of images of a plurality of items as the plurality of items is conveyed along a moving surface, wherein the one or more cameras includes a first camera, and wherein capturing the image data includes capturing, by the first camera, a first image of a first item of the plurality of items from a first vantage point at a first point in time, and capturing, by the first camera, a second image of the first item from a second vantage point at a second point in time;
capturing, by one or more sensors, additional sensor data relating to the plurality of items as the plurality of items is conveyed along the moving surface;
providing the image data and the additional sensor data as a multi-signal input to an item identification machine learning model (MLM);
receiving, from the item identification MLM, item identifiers corresponding to items recognized by the item identification MLM;
determining respective prices corresponding to the received item identifiers; and
adding respective representations of items corresponding to the received item identifiers and the respective prices to a transaction record for a current transaction.

2. The method of claim 1, wherein the one or more cameras further includes a second camera, and wherein capturing the image data further includes capturing, by the second camera, a third image of the first item from a third vantage point at the first point in time, and capturing, by the second camera, a fourth image of the first item from a fourth vantage point at the second point in time.

3. The method of claim 2, wherein the moving surface is a conveyor belt, and wherein the first camera and the second camera are fixed cameras located at different positions with respect to the conveyor belt.

4. The method of claim 3, wherein the conveyor belt includes one or more markings that indicate where the plurality of items is to be placed.

5. The method of claim 2, wherein the first vantage, the second vantage point, the third vantage point, and the fourth vantage point are different from each other.

6. The method of claim 1, wherein the one or more sensors are radio frequency identification (RFID) sensors, and the additional sensor data is RFID data received from a respective RFID tag affixed to each of one or more of the plurality of items, the RFID data including a respective identifier of each RFID tag and a respective identifier of each of the one or more of the plurality of items.

7. The method of claim 6, further comprising:
determining a first count of the plurality of items based at least in part on the item identifiers corresponding to the recognized items;
determining a second count of the plurality of items based at least in part on the RFID data; and
comparing the first count to the second count;
determining that the first count and the second count do not match; and
generating an alert to initiate an attendant intervention.

8. A hybrid checkout apparatus, comprising:
a point-of-sale (POS) system; and
a mechanism for conveying items,
wherein the POS system comprises:
a processor;
a memory storing executable instructions;
one or more cameras; and
one or more sensors, and
wherein the processor is configured to access the memory and execute the executable instructions to:
receive image data from the one or more cameras, the image data including a plurality of images captured by the one or more cameras of a plurality of items as the plurality of items is conveyed by the mechanism, wherein the one or more cameras includes a first camera, and wherein the first camera captures a first image of a first item of the plurality of items from a first vantage point at a first point in time and captures a second image of the first item from a second vantage point at a second point in time;
receive additional sensor data relating to the plurality of items from the one or more sensors, the additional sensor data being captured as the plurality of items is conveyed by the mechanism;
provide the image data and the additional sensor data as a multi-signal input to an item identification machine learning model (MLM);
receive, from the item identification MLM, item identifiers corresponding to items recognized by the item identification MLM;
determine respective prices corresponding to the received item identifiers; and
add respective representations of items corresponding to the received item identifiers and the respective prices to a transaction record for a current transaction.

9. The hybrid checkout apparatus of claim 8, wherein the one or more cameras further includes a second camera, and wherein the second camera, a third image of the first item from a third vantage point at the first point in time, and capturing, by the second camera, a fourth image of the first item from a fourth vantage point at the second point in time.

10. The hybrid checkout apparatus of claim 9, wherein the mechanism is a conveyor belt, and wherein the first camera and the second camera are fixed cameras located at different positions with respect to the conveyor belt.

11. The hybrid checkout apparatus of claim 10, wherein the conveyor belt includes one or more markings that indicate where the plurality of items is to be placed.

12. The hybrid checkout apparatus of claim 9, wherein the first vantage, the second vantage point, the third vantage point, and the fourth vantage point are different from each other.

13. The hybrid checkout apparatus of claim 8, wherein the one or more sensors are radio frequency identification (RFID) sensors, and the additional sensor data is RFID data received from a respective RFID tag affixed to each of one or more of the plurality of items, the RFID data including a respective identifier of each RFID tag and a respective identifier of each of the one or more of the plurality of items.

14. The hybrid checkout apparatus of claim 13, wherein the processor is further configured to execute the executable instructions to:
determine a first count of the plurality of items based at least in part on the item identifiers corresponding to the recognized items;
determine a second count of the plurality of items based at least in part on the RFID data; and
compare the first count to the second count;

determine that the first count and the second count do not match; and generate an alert to initiate an attendant intervention.

15. A non-transitory computer-readable medium storing executable instructions that when executed by at least one processor cause the at least one processor to perform a method, comprising:

capturing, by one or more cameras including a first camera, image data including a plurality of images of a plurality of items as the plurality of items is conveyed along a moving surface, wherein capturing the image data comprises:

capturing, by the first camera, a first image of a first item of the plurality of items from a first vantage point at a first point in time;

capturing, by the first camera, a second image of the first item from a second vantage point at a second point in time;

capturing, by one or more sensors, additional sensor data relating to the plurality of items as the plurality of items is conveyed along the moving surface;

providing the image data and the additional sensor data as a multi-signal input to an item identification machine learning model (MLM);

receiving, from the item identification MLM, item identifiers corresponding to items recognized by the item identification MLM;

determining respective prices corresponding to the received item identifiers; and adding respective representations of items corresponding to the received item identifiers and the respective prices to a transaction record for a current transaction.

16. The non-transitory computer-readable medium of claim 15, wherein the one or more cameras further includes a second camera fixedly located at a different position from the first camera, and wherein capturing the image data further includes:

capturing, by the second camera, a third image of the first item from a third vantage point at the first point in time; and capturing, by the second camera, a fourth image of the first item from a fourth vantage point at the second point in time.

* * * * *